United States Patent
Soulchin et al.

(10) Patent No.: US 7,859,535 B2
(45) Date of Patent: *Dec. 28, 2010

(54) DISPLAYING TRAFFIC FLOW DATA REPRESENTING TRAFFIC CONDITIONS

(75) Inventors: Robert M. Soulchin, King of Prussia, PA (US); Jonathon K. Agree, Newtown, PA (US); Brian J. Smyth, West Chester, PA (US)

(73) Assignee: Traffic.com, Inc., Wayne, PA (US)

( * ) Notice: Subject to any disclaimer, the term of this patent is extended or adjusted under 35 U.S.C. 154(b) by 24 days.

This patent is subject to a terminal disclaimer.

(21) Appl. No.: 12/386,745

(22) Filed: Apr. 22, 2009

(65) Prior Publication Data

US 2009/0262117 A1  Oct. 22, 2009

Related U.S. Application Data

(63) Continuation of application No. 11/528,730, filed on Sep. 28, 2006, now Pat. No. 7,535,470, which is a continuation of application No. 10/447,530, filed on May 29, 2003, now Pat. No. 7,116,326.

(60) Provisional application No. 60/408,652, filed on Sep. 6, 2002.

(51) Int. Cl.
   *G06T 11/20* (2006.01)
   *G06T 13/00* (2006.01)
   *G09G 5/00* (2006.01)

(52) U.S. Cl. .................. 345/440; 345/619; 345/473

(58) Field of Classification Search ............... 345/619, 345/440; 701/117–119, 200, 208
   See application file for complete search history.

(56) References Cited

U.S. PATENT DOCUMENTS

| | | | |
|---|---|---|---|
| 5,182,555 | A | 1/1993 | Sumner |
| 5,402,117 | A | 3/1995 | Zijderhand |
| 5,539,645 | A | 7/1996 | Mandhyan et al. |
| 5,594,432 | A | 1/1997 | Oliva et al. |
| 5,673,039 | A | 9/1997 | Pietzsch et al. |
| 5,774,827 | A | 6/1998 | Smith, Jr. et al. |
| 5,812,069 | A | 9/1998 | Albrecht et al. |

(Continued)

OTHER PUBLICATIONS

Award Abstract #0349460 for SBIR Phase II: Animated Real-Time Road Traffic Visualization for Broadcast and the Internet, National Science Foundation, Initial Amendment Date: Jan. 7, 2004, first date of publication: unknown, 2 pages.

(Continued)

*Primary Examiner*—Chante Harrison
(74) *Attorney, Agent, or Firm*—Lisa M. Schoedel; Frank J. Kozak; Jon D. Shutter

(57) ABSTRACT

An article of manufacture for displaying traffic flow data representing traffic conditions on a road system includes creating a graphical map of the road system which includes one or more segments. The status of each segment on the graphical map is determined such that the status of each segment corresponds to the traffic flow data associated with that segment. An animated traffic flow map of the road system is created by combining the graphical map and the status of each segment.

20 Claims, 9 Drawing Sheets
(6 of 9 Drawing Sheet(s) Filed in Color)

U.S. PATENT DOCUMENTS

| | | | |
|---|---|---|---|
| 5,845,227 | A | 12/1998 | Peterson |
| 5,889,477 | A | 3/1999 | Fastenrath |
| 5,908,464 | A | 6/1999 | Kishigami et al. |
| 5,926,113 | A | 7/1999 | Jones et al. |
| 5,959,577 | A | 9/1999 | Fan et al. |
| 5,982,298 | A | 11/1999 | Lappenbusch et al. |
| 5,987,374 | A | 11/1999 | Akutsu et al. |
| 5,987,377 | A | 11/1999 | Westerlage et al. |
| 6,107,940 | A | 8/2000 | Grimm |
| 6,150,961 | A | 11/2000 | Alewine et al. |
| 6,151,550 | A | 11/2000 | Nakatani |
| 6,161,092 | A | 12/2000 | Latshaw et al. |
| 6,317,686 | B1 | 11/2001 | Ran |
| 6,401,027 | B1 | 6/2002 | Xu et al. |
| 6,532,414 | B2 | 3/2003 | Mintz |
| 6,594,576 | B2 | 7/2003 | Fan et al. |
| 6,728,628 | B2 | 4/2004 | Peterson |
| 6,785,606 | B2 | 8/2004 | DeKock |
| 6,845,316 | B2 | 1/2005 | Yates |
| 6,862,524 | B1 | 3/2005 | Nagda et al. |
| 6,911,918 | B2 | 6/2005 | Chen |
| 6,989,765 | B2 | 1/2006 | Gueziec |
| 7,010,424 | B2 | 3/2006 | Zhao et al. |
| 7,161,497 | B2 | 1/2007 | Gueziec |
| 7,221,287 | B2 | 5/2007 | Gueziec et al. |
| 2002/0158922 | A1 | 10/2002 | Clark et al. |
| 2003/0171870 | A1 | 9/2003 | Gueziec |
| 2003/0225516 | A1 | 12/2003 | DeKock et al. |
| 2004/0083037 | A1 | 4/2004 | Yamane et al. |
| 2004/0243533 | A1 | 12/2004 | Dempster et al. |
| 2005/0033506 | A1 | 2/2005 | Peterson |
| 2005/0052462 | A1 | 3/2005 | Sakamoto et al. |
| 2005/0099321 | A1 | 5/2005 | Pearce |
| 2005/0099322 | A1 | 5/2005 | Wainfan et al. |
| 2007/0038362 | A1 | 2/2007 | Gueziec |
| 2008/0109153 | A1 | 5/2008 | Gueziec |

OTHER PUBLICATIONS

Product brochure for "Curious World Maps-Curious Map Presenter." Curious Software, downloaded from web site: http://www.curious-software.com/pdfs/Traffic_Flow.pdf, download date: Mar. 16, 2006, product release date: unknown, 1 page.

News Release: "Curious Software at NAB 2006: Curious Traffic Flow", downloaded from web site: http://www.curious-software.com/news/2006/2006_02.html, download date: Apr. 17, 2006, New release date: Mar. 2006, 2 pages.

Quicktime movie file of video presentation at Radio/Television News Directors Association (RTNDA) Conference in Fall 1997.

Quicktime movie file of WSOC-TV (Channel 9), Charlotte, NC traffic report using "Show FX" traffic application, aired on or about Feb. 2000.

Cathy Proctor, My TrafficNews.com seals patent, The Denver Business Journal, Jan. 18, 2005, 2 pages.

News Release: "Curious Software is using the NAB 2006 platform to showcase its revolutionary new Curious Traffic Flow," downloaded from web site: http://www.vizrt.com/perl/print?document=http://www.vizrt:com/db/106/10/33/document1010.ehtml, download date:. Mar. 16, 2006, original publication date: unknown, 2 pages.

Gueziec, Andre, "3D Traffic Visualization in Real Time," ACM Siggraph Technical Sketches, Conference Abstracts and Applications, p. 144, Los Angeles, CA, Aug. 2001.

| Sensor Id | Location | Direction | Raw Data (by lane) | | | Processed Data (all lanes) | Segment Feed | |
|---|---|---|---|---|---|---|---|---|
| | | | Left | Middle | Right | | Segment Id | Value |
| 539 | South of Exit 15 (Walt Whitman Bridge) | NB | 18 | 38 | 8 | 22 | 1007 | 1 |
| 540 | At the on-ramp from Columbus Blvd. | NB | 10 | 7 | 30 | 15 | 1008 | 2 |
| 541 | South of Exit 18 (Girard Ave.) | NB | 30 | 27 | 19 | 25 | 1009 | 1 |
| 542 | At on-ramp from Betsy Ross Bridge | NB | 66 | 59 | 48 | 58 | 1010 | 0 |
| 543 | At Exit 21 (Bridge St.) | NB | 74 | 63 | 68 | 68 | 1011 | 0 |
| 544 | North of Exit 21 (Bridge St.) | NB | 70 | 66 | 66 | 67 | 1012 | 0 |
| 545 | North of Exit 21 (Bridge St.) | NB | 33 | 28 | 35 | 32 | 1013 | 1 |

Fig. 6 – Sensor to Segment Mappings at time $T_0$

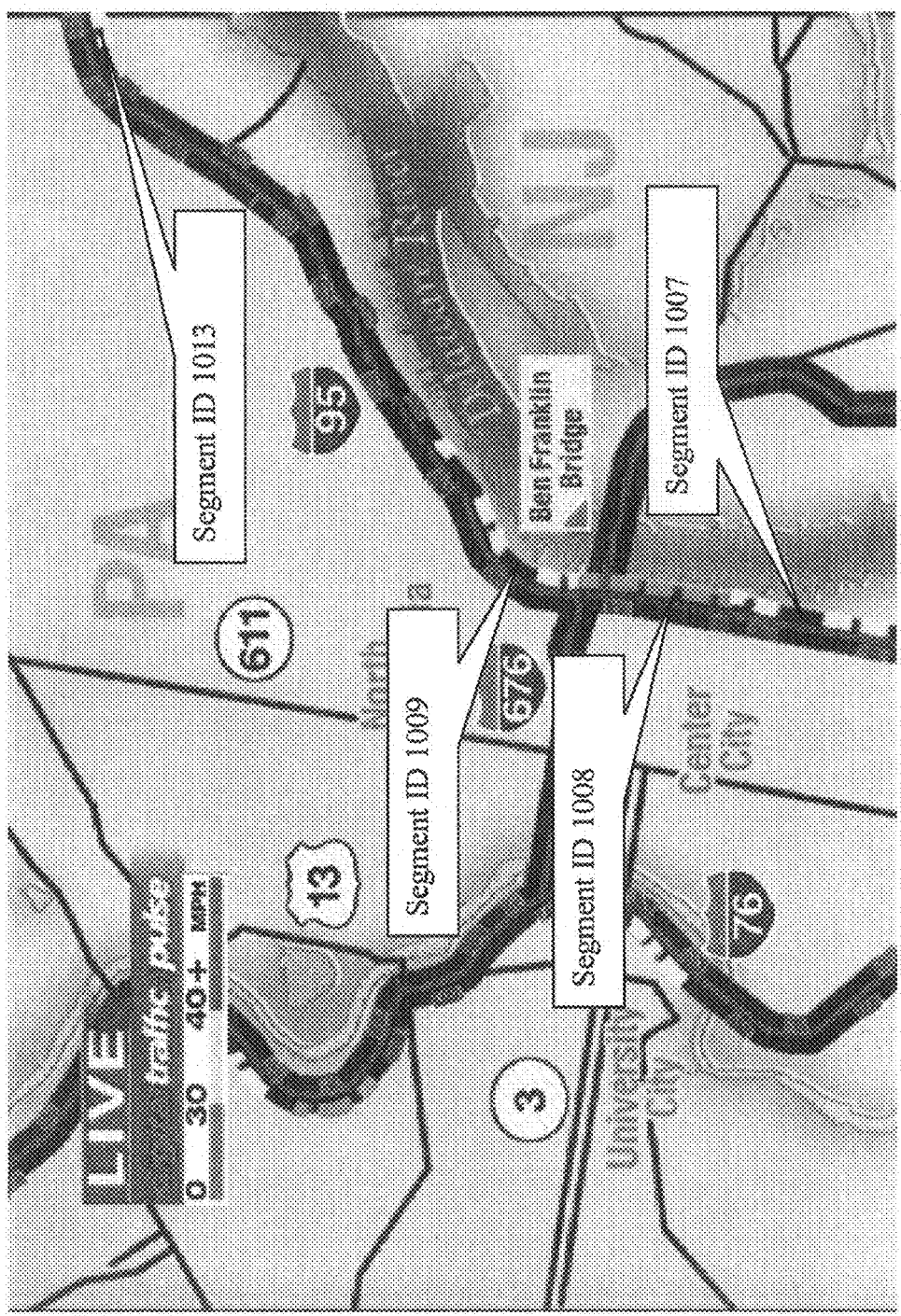
Fig. 7 – Product representation of time $T_0$

| Sensor Id | Location | Direction | Raw Data (by lane) | | | Processed Data (all lanes) | Segment Feed | |
|---|---|---|---|---|---|---|---|---|
| | | | Left | Middle | Right | | Segment Id | Value |
| 539 | South of Exit 15 (Walt Whitman Bridge) | NB | 15 | 23 | 9 | 16 | 1007 | 2 |
| 540 | At the on-ramp from Columbus Blvd. | NB | 12 | 15 | 38 | 22 | 1008 | 1 |
| 541 | South of Exit 18 (Girard Ave.) | NB | 33 | 45 | 48 | 42 | 1009 | 0 |
| 542 | At on-ramp from Betsy Ross Bridge | NB | 72 | 62 | 59 | 64 | 1010 | 0 |
| 543 | At Exit 21 (Bridge St.) | NB | 70 | 59 | 66 | 65 | 1011 | 0 |
| 544 | North of Exit 21 (Bridge St.) | NB | 7 | 17 | 33 | 19 | 1012 | 2 |
| 545 | North of Exit 21 (Bridge St.) | NB | 13 | 24 | 49 | 29 | 1013 | 1 |

Fig. 8 – Sensor to Segment Mappings at time $T_1$

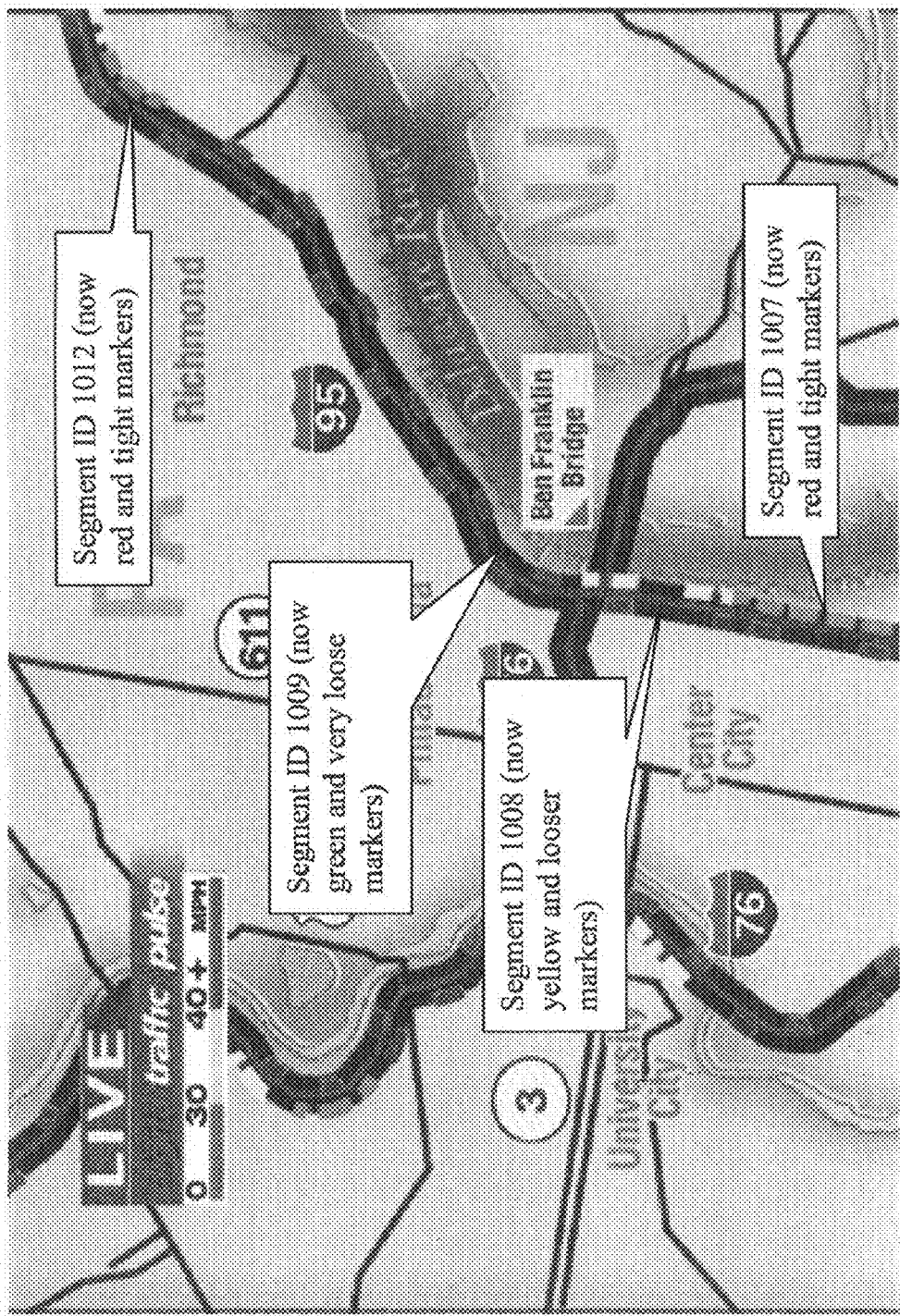
Fig. 9 – Product representation of time $T_1$

DISPLAYING TRAFFIC FLOW DATA REPRESENTING TRAFFIC CONDITIONS

CROSS REFERENCE TO RELATED APPLICATION

This application is a continuation of copending U.S. patent application Ser. No. 11/528,730 filed Sep. 28, 2006 entitled "Article of Manufacture for Displaying Traffic Flow Data Representing Traffic Conditions," which is a continuation of U.S. patent application Ser. No. 10/447,530 filed May 29, 2003 entitled "Method of Displaying Traffic Flow Data Representing Traffic Conditions," now U.S. Pat. No. 7,116,326. The entire disclosures of U.S. patent application Ser. Nos. 11/528,730 and 10/447,530 are incorporated herein by reference.

This application claims the benefit of U.S. Provisional Patent Application No. 60/408,652 filed Sep. 6, 2002 and entitled "Method of Producing Animated Television Graphics For Displaying Real-Time Traffic Conditions."

COMPACT DISC APPENDIX

This patent application includes an Appendix on one compact disc having a file named appendix.txt, created on May 28, 2003, and having a size of 1,748,579 bytes. The compact disc is incorporated by reference into the present patent application.

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND

The present invention relates generally to methods for graphically displaying traffic information for television broadcast, and more specifically to utilizing real-time traffic flow data to graphically display animated images representing that traffic flow data.

Graphics used in displaying traffic information to a broadcast television or cable audience are well known in the art. Generally, these are static graphics manually placed on a background static map or placed on a web page, which is rendered into a NTSC or similar signal for broadcast television. FIG. 1 depicts an example of such a system presently used to convey traffic information on television using a flat map. Television announcers use flat static maps containing traffic information as backdrops to talk over and convey traffic conditions.

Another known system is designed and utilized by Mobility Technologies, Inc., which converts real-time traffic flow data from a proprietary system into a color coded static web image graphic such as a GIF, or JPEG format. This graphic image is retrieved over the Internet or a similar connection by a television station, which then renders the static web image into a broadcast signal such as NTSC. FIG. 2 shows an example of such a system presently used by Mobility Technologies to convey traffic flow data. In FIG. 2, traffic flow data is depicted with different status colors to represent current road conditions. The status colors (i.e., green, yellow, red) represent the traffic flow data for a particular portion, or segment of roadway. Although this data results from real-time traffic flow data, it is limited to a static display of colors with no motion to depict current road conditions. The status colors cannot change in real-time as actual road conditions change because a static web image must initially be created from the traffic flow data.

However, the method utilized by Mobility Technologies, as well as the other known methods of graphically displaying traffic information, have various disadvantages. The most significant disadvantage is that the graphical image of the traffic flow is static. That is, the graphic is simply a picture (sometimes in color) of a pre-existing traffic flow map, which is then placed on television. As such, the image is not visually appealing. The traffic flow map does not provide an automated or animated, real-time representation of the actual, current traffic conditions at the instant the image is broadcast over the television network. Furthermore, the background graphic images used to create the traffic flow map tend to have very large file sizes, even though the amount of actual traffic data which is changing in real-time is quite small in comparison to overall file size of the traffic flow map. Therefore, the transport of the image data containing the traffic flow map from the web page to the television network results in large data transport inefficiencies. Additionally, because the rendered traffic graphic is a static, raster-based image, there is presently no easy method to override an individual traffic flow segment (i.e., a discrete portion of a roadway) shown on the traffic flow map in the case of an error, or just for visual purposes of TV broadcasting.

SUMMARY

The present invention overcomes these disadvantages by significantly improving the current methods of producing and providing traffic information. One aspect of the present invention provides a television or cable station with a traffic flow map that visually shows an animated graphic of the traffic conditions on one or more roadways in and around a metropolitan area. The traffic flow map is automatically generated from real-time traffic flow data, and continually changes in real-time as the actual, current traffic conditions change.

Another aspect of the present invention provides a data stream containing traffic flow data (for example, speed, volume and density) which has parameters that allow it to be input into a third party graphics engine to produce corresponding color coded animated traffic flow on the traffic flow map.

Another aspect of the present invention provides an override capability, such that if there is a technical or visual error with the traffic flow data displayed, the end producer of the TV broadcast product is able to redefine the traffic flow map on a segment-by-segment basis.

BRIEF DESCRIPTION OF THE DRAWINGS

The present invention will be more fully understood from the detailed description given herein below and the accompanying drawings, which are given by way of illustration only and are not to be considered as limiting the present invention.

The patent or application file contains at least one drawing executed in color. Copies of this patent or patent application publication with color drawing(s) will be provided by the Office upon request and payment of the necessary fee.

In the drawings:

FIG. 1 is a static traffic flow map according to a method of displaying traffic information generally known in the art;

FIG. 2 is a static color coded traffic flow map according to another method of displaying traffic information generally known in the art;

FIG. 3 is a diagram of the traffic flow data system according to one embodiment of the present invention;

FIG. 4 is an animated, color coded traffic flow map according to one embodiment of the present invention;

FIG. 5 is an animated, color coded traffic flow map according to another embodiment of the present invention;

FIG. 6 is a table depicting an example from sensor to segment traffic flow data at time $T_0$ according to the present invention;

FIG. 7 is an animated, color coded traffic flow map according to the example representation of FIG. 6;

FIG. 8 is a table depicting an example from sensor to segment traffic flow data at time $T_1$ according to the embodiment of FIG. 6; and FIG. 9 is an animated, color coded traffic flow map according to the example representation of FIG. 8.

DETAILED DESCRIPTION

The present invention provides a method for supplying aggregated, real-time traffic flow data into a third-party graphical engine to produce real-time, animated, broadcast quality, traffic reports to television and cable stations. Those skilled in the art will recognize that the traffic reports may also be rendered for satellite broadcast.

Figure 1:
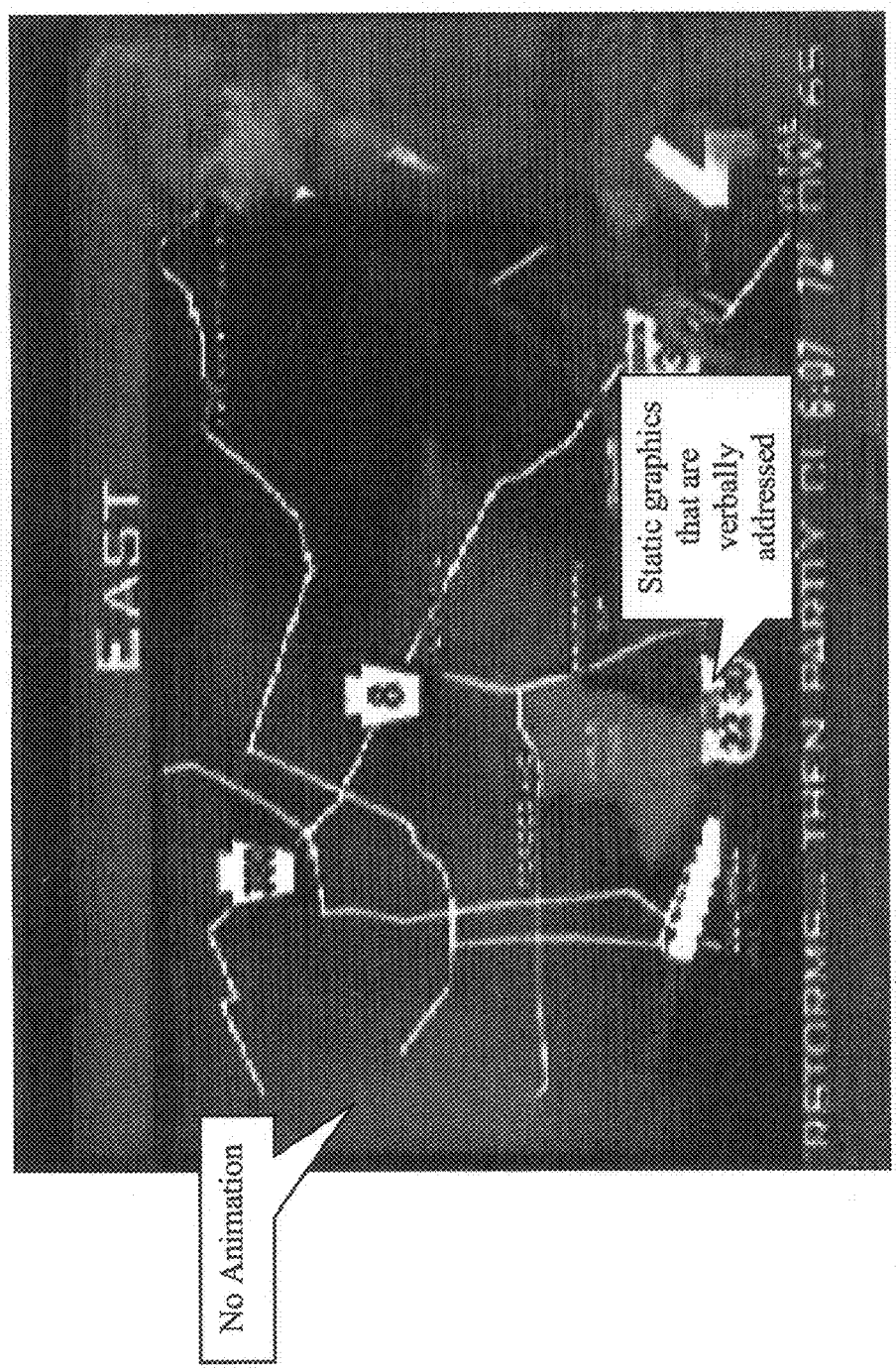
Figure 2:
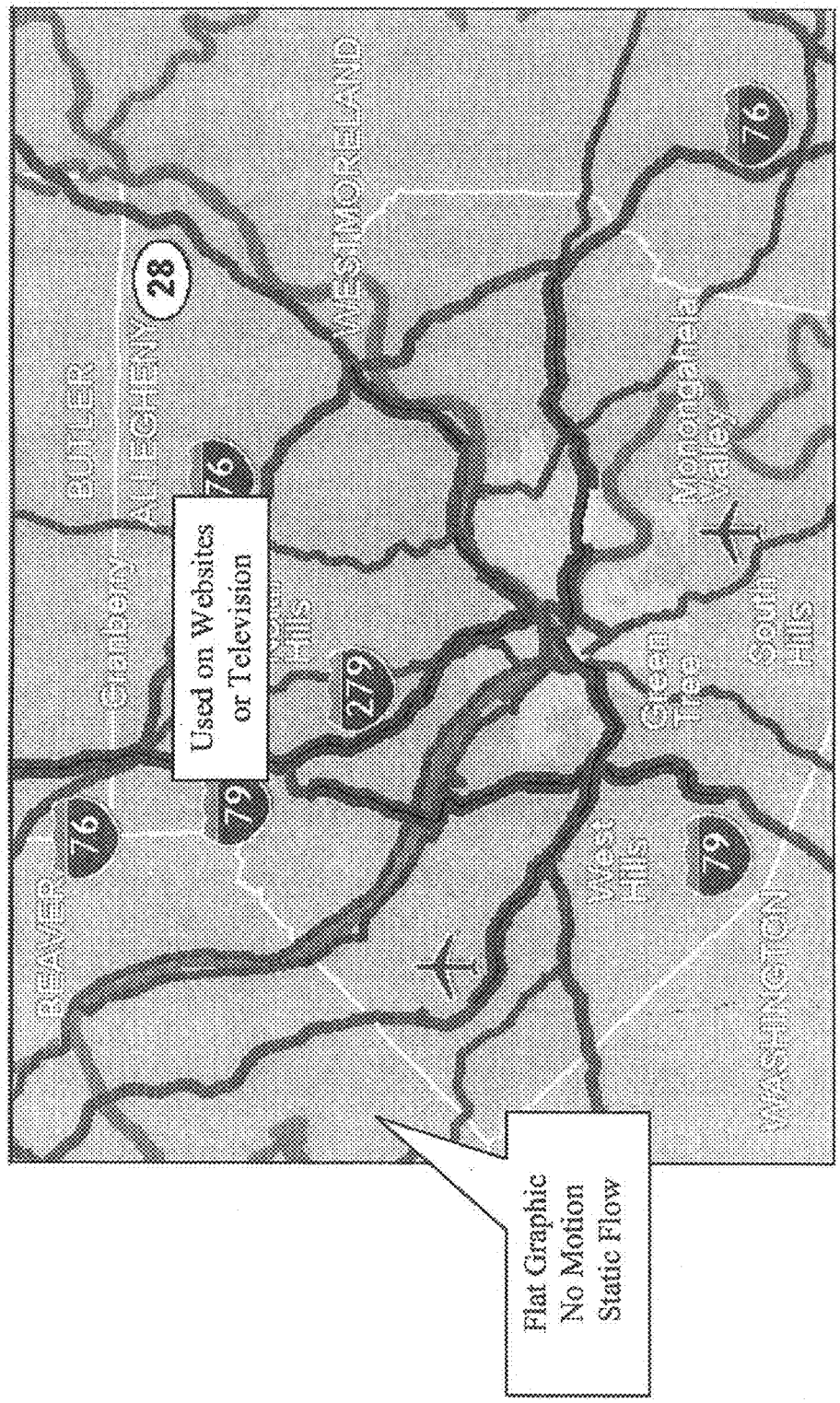
Figure 3:
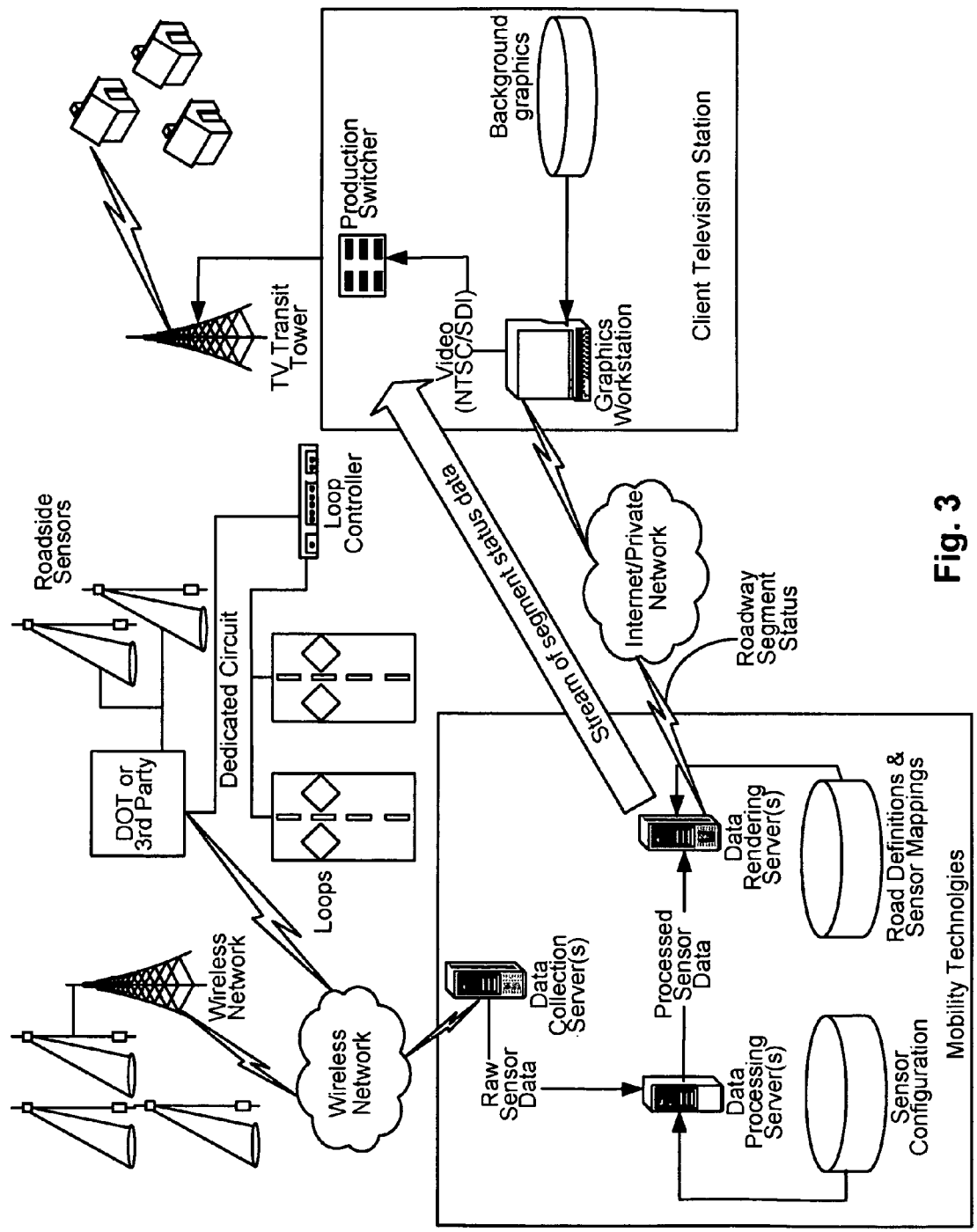

Embodiments of the present invention are described by way the architectural diagram shown in FIG. 3, and the software code base that was utilized during development of the present invention. A copy of the software code is attached as "Appendix". Those of ordinary skill in the art will recognize that the collection of digital real-time traffic data is generally know in the art, and is omitted from the present disclosure, as well as the attached code, for simplicity, and should not be considered limiting. Additionally, the attached code is dependent on the following known technologies:

1. Java 2 SDK version 1.3
2. J2EE version 1.3 Application Server
3. Xerces version 1
4. Xalan version 1
5. Oracle JDBC version 8.1.7

Referring to FIG. 3, the present invention provides a means to send real-time changes of traffic flow data to the third-party graphical engine (potentially located within a broadcast station) using a unique data format (described in the attached code). In one preferred embodiment, the traffic flow data is transmitted directly from the data rendering server to the broadcast station. The traffic flow data includes graphical information related to the actual sensor and/or segment data which the graphical engine uses to create a traffic flow map. Since only the changing real-time traffic flow data is transmitted to the graphical engine, the present invention provides very efficient transfer of the traffic flow data.

Figure 4:
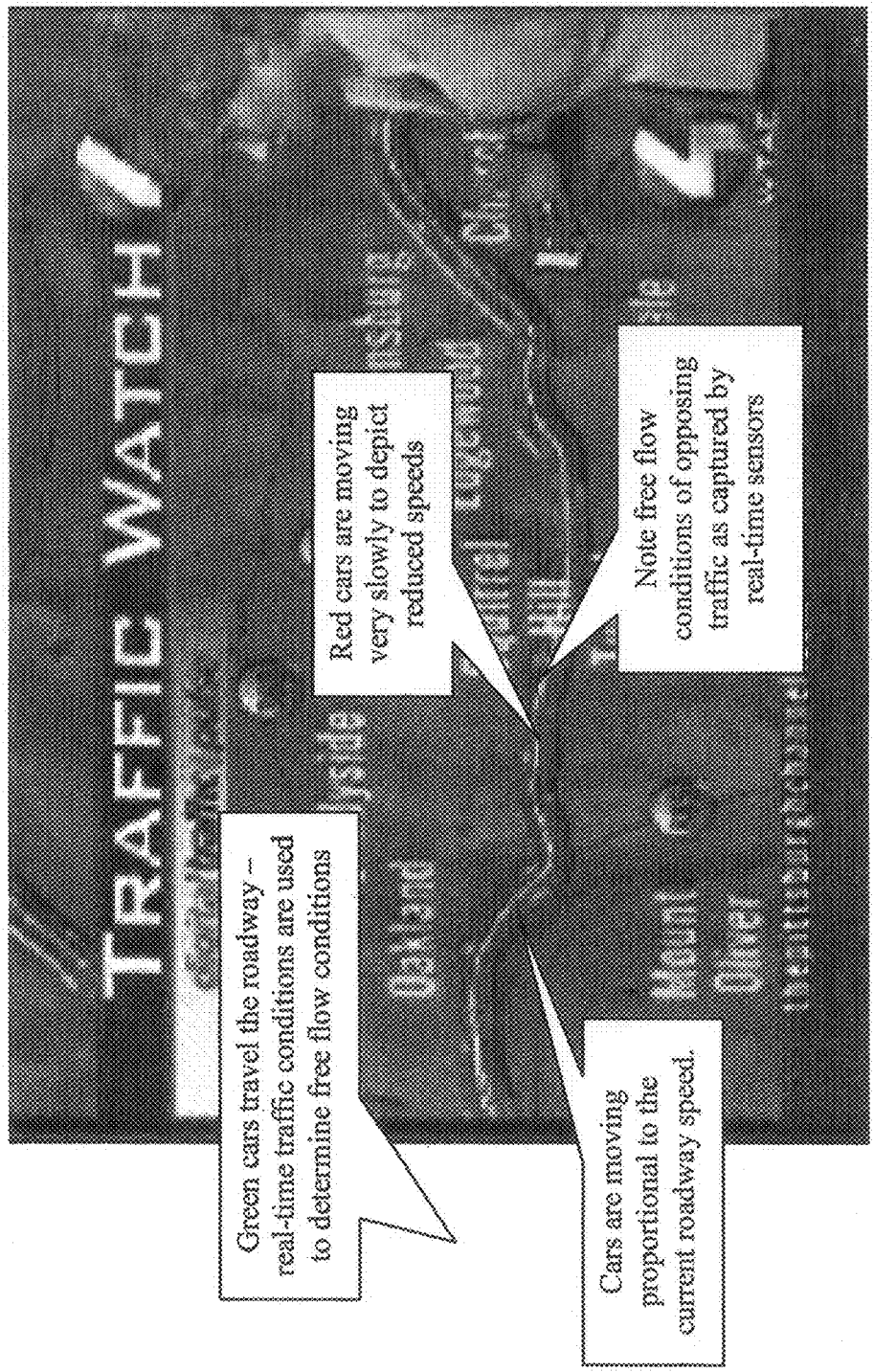
Figure 5:
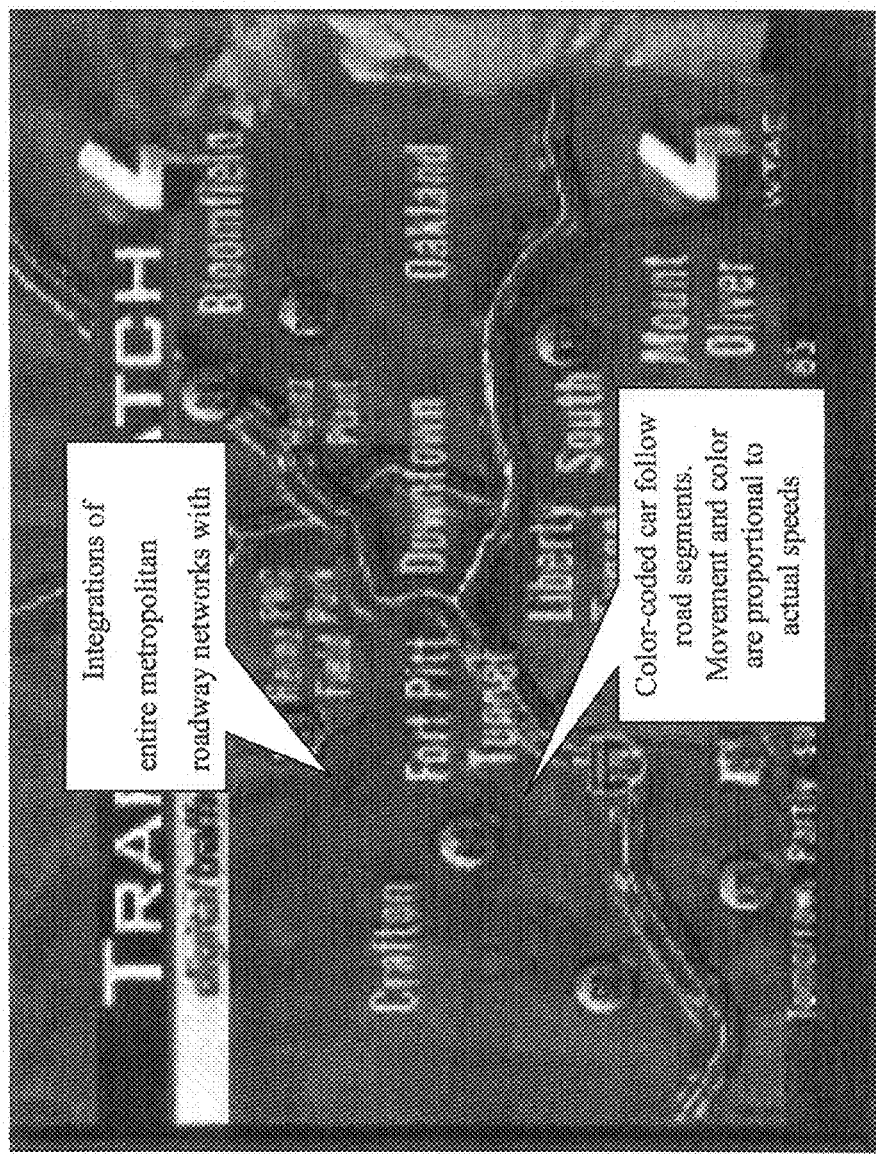

Upon the collection of real-time traffic flow data, the present invention allows television stations to integrate a real-time data feed of current traffic conditions to produce animated, color coded graphics that convey travel speeds, volume, congestion (density) along a given section of roadway, or over an entire metropolitan road network. The traffic flow data, representing the current traffic conditions, is combined with a customized look and feel to create the traffic flow map. Color coded, moving graphics, which follow the actual roadway for which the traffic flow data is being provided, complete the traffic flow map so that an the end user sees an accurate, graphical, color coded representation of current traffic conditions which reflect real-time changes in the traffic flow (see FIG. 4). FIG. 5 shows an example of a traffic flow map for an entire metropolitan area. Thus, the graphics on the traffic flow map not only represent current traffic information, but also show changes in real-time as actual traffic conditions change.

The traffic flow data provided to the third-party graphical engine allows for automatic animation of the traffic flow conditions when displayed by the graphical engine to the television viewer. The animation is designed to show the movement of cars (or similar graphical representations) in the exact segment of the highway to which that particular traffic flow data refers. The animation is geographically located on the traffic flow map to correspond to the geographical location of the particular road segment. The animation is representative of the current actual speed, volume, and density within that segment. The cars on the traffic flow map move within a segment on the map at a rate representative of the actual roadway speed for that segment. The number of cars on that segment of the map represents the actual volume of cars in that segment. The color of a particular segment and the cars within it represents the current density of that segment. The ability to provide this level of detail for animation is based on specific parameters provided in the traffic flow data that is input into the graphical engine.

Another unique aspect is that the traffic flow data provided to the graphical engine (and thus the traffic flow map) also allows for the input of incident information such as an "over turned car" or "two car accident" as well as traditional flow data (speed, volume and density). Incident information can subsequently be integrated into the traffic flow map to further indicate the real-time traffic conditions in a particular roadway segment.

FIGS. 6-9 illustrate an example of the present invention. The table of FIG. 6 depicts the initial state (at time $T_0$) of a collection of sensors which monitor traffic flow for I-95 NB. The column for the 'Sensor Id' contains a unique identifier for each sensor. The 'Location' is a textual description of the location of the corresponding sensor. The 'Direction' is the direction of travel the corresponding sensor is monitoring. The 'Raw Data' is the last reading of the raw speed data, broken down by lane. The 'Processed Data' is a direction-based speed value associated with the corresponding sensor. For the purposes of this example, the Processed Data is an average of the three raw data lanes. In the actual real-time system, the Processed Data is a fairly complicated calculation of current speed readings by lane, historical data, volume and occupancy. Finally, the 'Segment Feed' is the final output that is sent to the Graphics Workstation for processing of the traffic flow data. The 'Segment Id' is a unique identifier for the segment being illustrated by the graphics engine and the 'Value' is a value representing the state of the segment, where 0 is equivalent to green (fast moving vehicles having a speed >40 MPH), 1 is equivalent to yellow (moderate moving cars having a speed from 20-40 MPH), and 2 is equivalent to red (very slow moving cars having a speed <20 MPH).

Note that in this example there are three segments that are in the yellow, moderate congestion state (ids 1007, 1009, 1013) and one segment is in the red, heavy congestion state (id 1008). The remaining three segments are in a free-flow, green state. This final data is represented in the end product in FIG. 7. As time changes to $T_1$ the sensor values change based on the current traffic conditions, represented by the table of FIG. 8. Note that the state changes are reflected from the sensor data, from the real-time data collection of the sensors. The highlighted lines of FIG. 8 reflect sensors that have changed state from time $T_0$ to time $T_1$. This state change is reflected in the end product view in FIG. 9.

The present invention may be implemented with any combination of hardware and software. If implemented as a computer-implemented apparatus, the present invention is implemented using means for performing all of the steps and functions described above.

The present invention may be implemented with any combination of hardware and software. The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method of displaying traffic flow data representing traffic conditions, comprising:
   receiving traffic flow data associated with movement of vehicles traveling in a first direction and a second direction on a road; and
   creating a traffic flow map using the traffic flow data, wherein the traffic flow map includes an animated graphic that represents the movement of the vehicles traveling in the first direction distinctly from the movement of the vehicles traveling in the second direction.

2. The method of claim 1, further comprising presenting the traffic flow map in a television traffic report.

3. The method of claim 1, wherein the traffic flow map further includes incident information.

4. The method of claim 1, wherein the animated graphic moves at a rate associated with the movement of the vehicles.

5. The method of claim 1, wherein the animated graphic is color coded to represent density of the vehicles on the road.

6. The method of claim 1, wherein the animated graphic includes vehicle images.

7. The method of claim 6, wherein a number of the vehicle images in the animated graphic is representative of volume of the vehicles on the road.

8. A method of displaying traffic flow data representing traffic conditions, comprising:
   receiving traffic flow data;
   automatically generating a traffic flow map with the traffic flow data, wherein the traffic flow map includes moving images to represent traffic conditions on at least a portion of a roadway.

9. The method of claim 8, wherein the traffic flow data includes a segment identifier for a segment and value associated with a state of the segment.

10. The method of claim 8, wherein a graphical engine automatically generates the traffic flow map.

11. The method of claim 8, wherein the moving images include vehicle images.

12. The method of claim 8, wherein the traffic flow map further includes incident information.

13. A method of presenting a traffic flow map representing traffic conditions on a road system, comprising:
   a graphical map of a road system; and
   animated images located on the graphical map representing speed, volume, and density of traffic flow on at least a portion of the road system.

14. The method of claim 13, wherein the animated images move at a rate representative of the speed of the traffic flow.

15. The method of claim 13, wherein a number of the animated images located on the graphical map represent the volume of the traffic flow.

16. The method of claim 13, wherein the animated images are color coded to represent the density of the traffic flow.

17. A method of presenting a traffic flow map representing traffic conditions on a road system, comprising:
   a graphical map of a road network; and
   an animated graphic located on the graphical map that represents traffic flow of vehicles traveling on at least a portion of the road network, wherein the animated graphic distinguishes between the traffic flow in a first direction and the traffic flow in a second direction for at least one road in the road network.

18. The method of claim 17, wherein the animated graphic includes vehicle images and a first portion of the vehicle images move in the first direction on the at least one road and a second portion of the vehicle images move in the second direction on the at least one road.

19. The method of claim 17, wherein the animated graphic represents speed, volume, and density of the traffic flow of the vehicles traveling on the at least a portion of the road network.

20. The method of claim 17, further including incident information located on the graphical map.

* * * * *